(12) United States Patent
Littmann

(10) Patent No.: US 11,409,691 B2
(45) Date of Patent: Aug. 9, 2022

(54) HIGH SPEED ON DIE SHARED BUS FOR MULTI-CHANNEL COMMUNICATION

(71) Applicant: MACOM Technology Solutions Holdings, Inc., Lowell, MA (US)

(72) Inventor: Bengt Littmann, Toronto (CA)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 17/128,087

(22) Filed: Dec. 19, 2020

(65) Prior Publication Data

US 2022/0197849 A1    Jun. 23, 2022

(51) Int. Cl.
*G06F 13/42*     (2006.01)
*G06F 7/58*     (2006.01)
(Continued)

(52) U.S. Cl.
CPC .......... *G06F 13/4291* (2013.01); *G06F 7/584* (2013.01); *G06F 11/0706* (2013.01);
(Continued)

(58) Field of Classification Search
CPC .. G06F 13/4291; G06F 7/584; G06F 11/0706; G06F 11/0736; G06F 11/0751;
(Continued)

(56) References Cited

U.S. PATENT DOCUMENTS 6,292,911 B1 *  9/2001  Swanson ............. G06F 11/1008
                                                        714/715
6,346,832 B1    2/2002  Young
(Continued)

FOREIGN PATENT DOCUMENTS

JP         2011-211410       10/2011
WO     WO 2019/015325        1/2019
WO     WO 2019/003588       10/2019

OTHER PUBLICATIONS

French National Institute of Industrial Property ("INPI") Preliminary Report issued for Application No. FR1910458 dated Jun. 19, 2020.

(Continued)

Primary Examiner — Glenn A. Auve
(74) Attorney, Agent, or Firm — Weide & Miller, Ltd.

(57) ABSTRACT

A shared bus for inter-channel communication comprising two or more channels having signal processing elements such that each channel is configured to receive and process an incoming channel specific signal. A sequence generator is configured to generate a test sequence suitable for testing the signal processing elements of a channel. An error checker is configured to error check incoming channel specific signals. A shared bus connects to the two or more channels to communicate an incoming channel specific signal to the error checker and communicate the test sequence to the signal processing elements of a channel. One or more pull up resistors and/or termination resistors connect to the shared bus. The bus may comprise a clock signal path and a data signal path. The test sequence may be a pseudo-random bit sequence. The bus interface comprises an open collector current mode logic driver in cascode arrangement.

19 Claims, 7 Drawing Sheets

(51) Int. Cl.
  *G06F 13/364* (2006.01)
  *G06F 11/07* (2006.01)
  *G06F 11/34* (2006.01)
  *G06F 11/30* (2006.01)

(52) U.S. Cl.
  CPC ...... *G06F 11/0736* (2013.01); *G06F 11/0751* (2013.01); *G06F 11/3027* (2013.01); *G06F 11/3485* (2013.01); *G06F 13/364* (2013.01); *G06F 13/4295* (2013.01); *G06F 2213/0016* (2013.01)

(58) Field of Classification Search
  CPC ............. G06F 11/3027; G06F 11/3485; G06F 13/364; G06F 13/4295; G06F 2213/0016
  See application file for complete search history.

(56) References Cited

U.S. PATENT DOCUMENTS

| | | |
|---|---|---|
| 6,624,405 B1 | 9/2003 | Lau et al. |
| 6,731,161 B1 | 5/2004 | O'Leary |
| 8,225,017 B1 | 7/2012 | Tang et al. |
| 9,246,450 B2 | 1/2016 | Schacht et al. |
| 10,097,147 B2 | 10/2018 | Lin |
| 10,641,823 B2 | 5/2020 | Lu et al. |
| 2005/0086563 A1* | 4/2005 | Carballo .................. H04L 1/203 714/704 |
| 2005/0242841 A1 | 11/2005 | Mitsuishi |
| 2009/0091369 A1 | 4/2009 | Farmer |
| 2009/0195272 A1 | 8/2009 | Okuzono |
| 2010/0052765 A1 | 3/2010 | Makino |
| 2010/0164762 A1* | 7/2010 | Datta .................. H03M 1/1095 341/118 |
| 2012/0063773 A1* | 3/2012 | Sluz .................. H04B 10/1121 398/27 |
| 2013/0015881 A1 | 1/2013 | Lee et al. |
| 2017/0359636 A1 | 12/2017 | Nagarajan |
| 2020/0106439 A1 | 4/2020 | Funabashi |

OTHER PUBLICATIONS

International Search Report dated Nov. 30, 2020 for corresponding Application No. PCT/2020/048817.

\* cited by examiner

HIGH SPEED ON DIE SHARED BUS FOR MULTI-CHANNEL COMMUNICATION

1. FIELD OF THE INVENTION

The invention relates to inter-channel communication, and in particular to a shared bus for use during error checking and test signal generation.

2. RELATED ART

Functionality and complexity are continuously being added to semiconductors. To increase testing efficiency, end users request built-in diagnostic features to quickly debug their systems without having to arrange and connect complex and expensive test equipment. In data centers, this means being able to break an underperforming link, inject a known data pattern, such as a pseudo-random bit sequence (PRBS) generator, and check for bit errors at various locations to successfully debug the link.

FIG. 1 illustrates an exemplary prior art multi-channel communication system with co-integrated diagnostic elements. This example embodiment is in an optic communication system having four channels 104A, 104B, 104C, and 104D as shown. Each channel may include transmit and receive components to accommodate incoming and outgoing data transmissions. The electrical elements of a receiver are provided an electrical signal, such as from a photodetector and transimpedance amplifier (not shown) on input 108 to an AFE (Analog Front End) 112) which processes and converts an analog signal to a digital signal. The digital signal is provided to a CDR (Clock Data Recovery) circuit 116 which recovers the clock and data, both of which are provided to a driver 120 configured to amplify the signal for downstream components.

The diagnostic elements are shown with the sequence generator 124 and the error checker 128 connected to the driver 120 with two paths 132, 136 each. These paths 132, 136 are high speed paths and as such must be dimensionally configured to handle high speed operation. There is a sequence generator 124 and the error checker 128 associated with each channel. Thus, the system of FIG. 1 would have four sequence generators 124 and four error checkers 128. While this system was acceptable for prior art systems, which allocate a channel pitch of 750 µm, this physical arrangement became impossible when less area was available due to the combined size of the signal path and the diagnostic elements. For example, the diagnostic systems take up about ⅔ of the available area.

At the same time, die size, and particularly channel pitch, are not expected to grow, these factors must confirm with industry standard components (on the optical side the channel pitch is only 250 um). Even with the current generation of datacom chips which integrate CDR functions with electrical to optical conversion (E to O), and vice versa (O to E) have very elongated die sizes (2:1 ratio), which leaves no room for diagnostic blocks. It should be further noted that diagnostic blocks are often overlooked sophisticated subsystems and therefore very large. As shown below in FIG. 2, the diagnostics elements must be moved off to the side, which creates a new problem: transmitting high-speed data back and forth.

FIG. 2 illustrates an alternative prior art design when the allocated channel width per channel is 250 µm. In this layout the diagnostic elements 204, 208 are forced off channel, thereby requiring two communication paths for each channel resulting in 16 total pairs of controlled impedance traces (communication paths) (two for the NRZ streams) which must be capable and sized for high-speed communication to reach each channel 104A, 104B, 104C, 104D. These signaling trace paths must travel distances of millimeters which require impedance-controlled transmission lines. Each channel has two differential pairs that connected to diagnostic elements 204, 208 which are dedicated with each channel. Thus, there are diagnostic elements 204, 208 associated with each channel. In a four-channel system where would be four sets of diagnostic elements 204, 208 such that each channel 104A, 104B, 104C, 104D would each have associated diagnostic elements 204, 208. This arrangement consumes space, power resources, and given the narrow channel width space allocation, may be to be located off die.

While including built-in diagnostic features is known, the complexity is greatly increased and compounded with the transition to new multi-level modulation schemes (NRZ to PAM-4). On chip, this requires multiple parallel high-speed paths which take up a significant amount of space. For example, each path at 30 Gb/s would be 30 µm wide to avoid unwanted loss of signal integrity. This path size would be duplicated eight times, resulting a total path width which is undesirably space consuming and would not fit within the 250 µm channel width allocation.

SUMMARY

To overcome the drawbacks of the prior art and provide additional benefit, a shared bus for inter-channel communication is disclosed. In one embodiment the shared bus for inter-channel communication includes two or more channels having signal processing elements. Each channel is configured to receive and process an incoming channel specific signal. A sequence generator is configured to generate a test sequence suitable for testing the signal processing elements of a channel. An error checker is provided and configured to analyze incoming channel specific signals for errors. The shared bus connects to the two or more channels to communicate an incoming channel specific signal to the error checker and communicate the test sequence to the signal processing elements of a channel. Also part of this embodiment is a one or more loads connected to the shared bus. The load may be one or more resistors, one or more resistor and a peaking inductor, or any other type load.

In one embodiment, the bus consists of a clock signal path and a data signal path. The test sequence may be a pseudo-random bit sequence. The size, location, and number of loads (such as pull up resistors) are selected to optimize reflection and jitter. In one embodiment, the error checker is configured to compare the incoming channel specific signal to a known channel specific signal generated by the sequence generator to detect errors. In one configuration, each channel has a bus interface comprising an open collector current mode logic driver in cascode arrangement.

Also disclosed is a method for inter-channel communication over a shared bus. One embodiment of this method includes initiating an error checking mode for a selected channel. For the selected channel, enabling transmission or receipt of data over the shared bus and for non-selected channels, disabling transmission or receipt of data over the shared bus. Generating sequence data with a sequence generator and transmitting sequence data over the shared bus from the sequence generator to the selected channel. Then processing the sequence data with the selected data to create processed sequence data and error checking the processed sequence data for errors by comparing the processed sequence data to the sequence data.

In one embodiment, the bus consists of a clock signal path and a data signal path. The test sequence may be a pseudo-random bit sequence. The size, location, and number of loads are selected to optimize reflection and jitter. The method of claim 7 wherein the error checker is configured to compare the incoming channel specific signal to a known channel specific signal generated by the sequence generator to detect errors. In one configuration, each channel has a bus interface comprising an open collector current mode logic driver in cascode arrangement.

Also disclosed is an inter-channel communication system comprising two or more data communication channels, each having data processing components. A bus driver is associated with each channel such that the bus driver is configured to seize or release the bus and transmit or receive data over the shared bus. A shared bus connects to the bus driver associated with each channel such that the shared bus also connects to at least one error checker and a sequence generator configured to generate sequence data.

As discussed herein, the shared bus is a two-conductor bus that consists of a clock signal path and a data signal path. The sequence generator may be configured to generate a pseudo-random bit sequence and transmitting over the shared bus may occur using a bus driver associated with the sequence generator. This system may further comprise two or more pullup resistors connected to the shared bus. In one configuration, the error checker is configured to process the sequence data generated by the sequence generator, after processing by the data processing components, to detect errors. The system may include one or more termination resistors connected to a shared bus to reduce reflections and jitter.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 3:
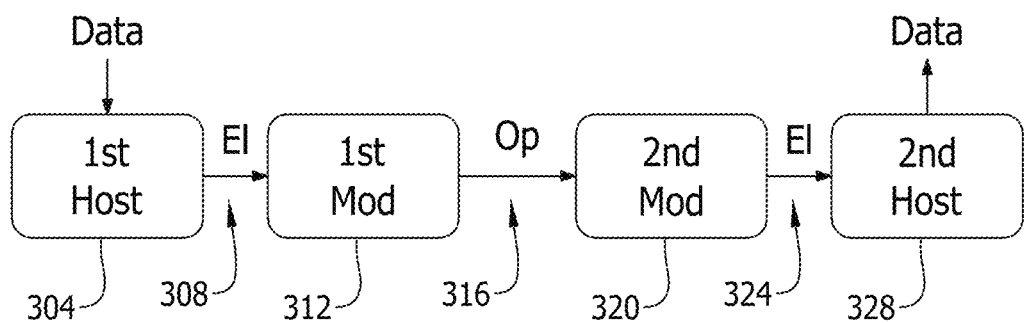
FIG. 3 illustrates an example environment of use.

FIG. 3 illustrates an example environment of use. In this example embodiment, a first host 304 generates or received data to be transmitted to a remote location, such as to a second host 328. The first host 304 processes the data and prepares it for transmission before providing it to a first optic module 312. The data from the first host 304 travels to the first optic module 312 as an electrical signal over an electrical channel 308.

The first optic module 312 converts the electrical signal representing the data to an optic signal which is transmitted over an optic channel 316, such as a fiber optic cable, to a second optic module 320. In the second optic module, the optic signal is converted to an electrical signal, which is provided to the second host 328 over an electrical channel 324. The second host 328 recovers and restores the data after the passage from the remote first host 304 and presents the data for use by subsequent processing elements. This processing path is reversed for data transmitted from the second host 328 to the first host 304. Although shown in the form of an optic communication system, it is also contemplated that the innovation disclosed herein may be used in an electrical or wireless communication environment.

Figure 4:
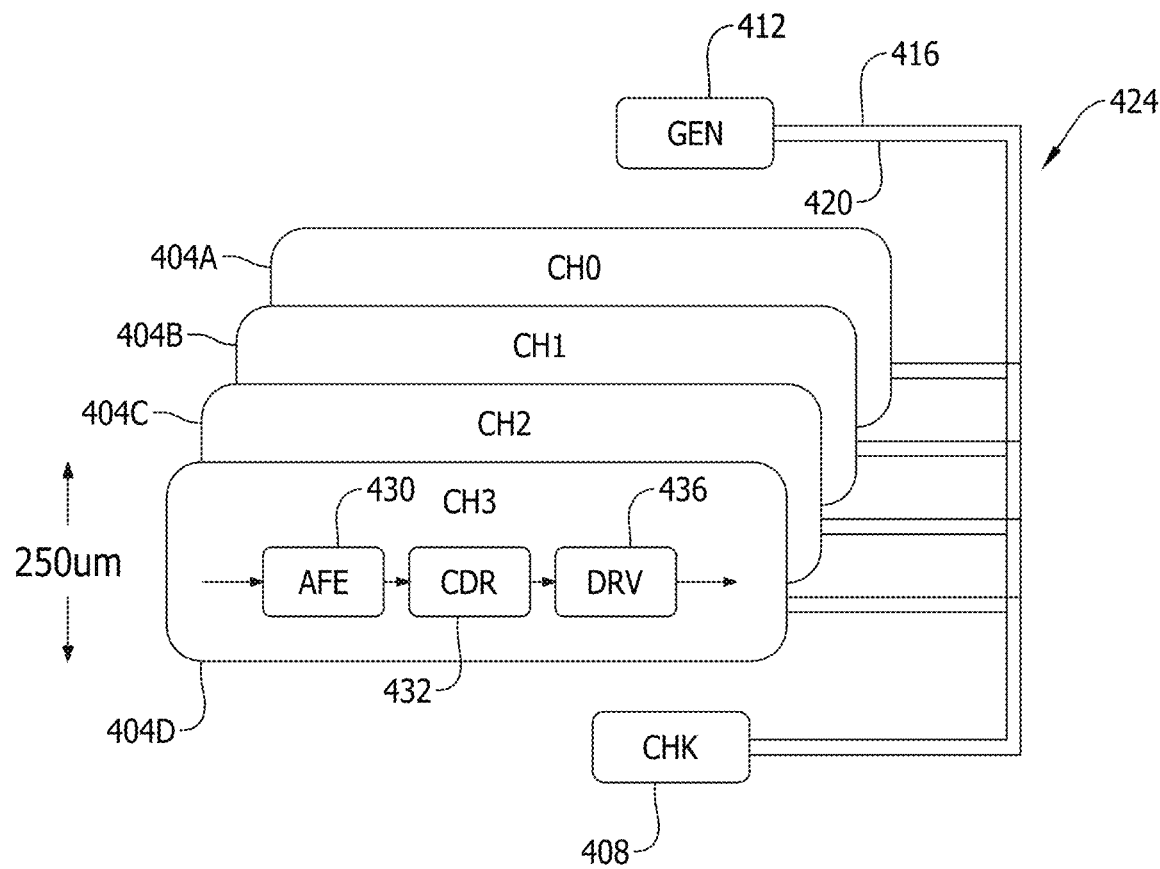
FIG. 4 illustrates an example embodiment of a high-speed communication layout between diagnostic elements and multiple communication channels.

FIG. 4 illustrates an example embodiment of a high-speed communication layout between diagnostic elements and multiple communication channels. This but one example embodiment and as such other configurations are possible without departing from the scope of the claims. In this embodiment, only 250 μm is allocated for each channel width, thus presenting layout challenges for the reasons set forth in the Background section. Within this width are the AFE 430, CDR 432 and driver 436 which consume die area and there is no remaining room for the large pattern generator 412 and error checking module 408. Therefore, the pattern generator 412 and error checking module 408 are shared between multiple channels 404. Connecting each channel 404A, 404B, 404C, 404D to the pattern generator 412 and error checking module 408 is a two-path shared bus 424 having a data path 416 and a clock path 420. Within each channel 404A, 404B, 404C, 404D and the pattern generator 412 and error checking module 408 are drivers which send and receive the data and are synchronized by the clock.

Figure 1:
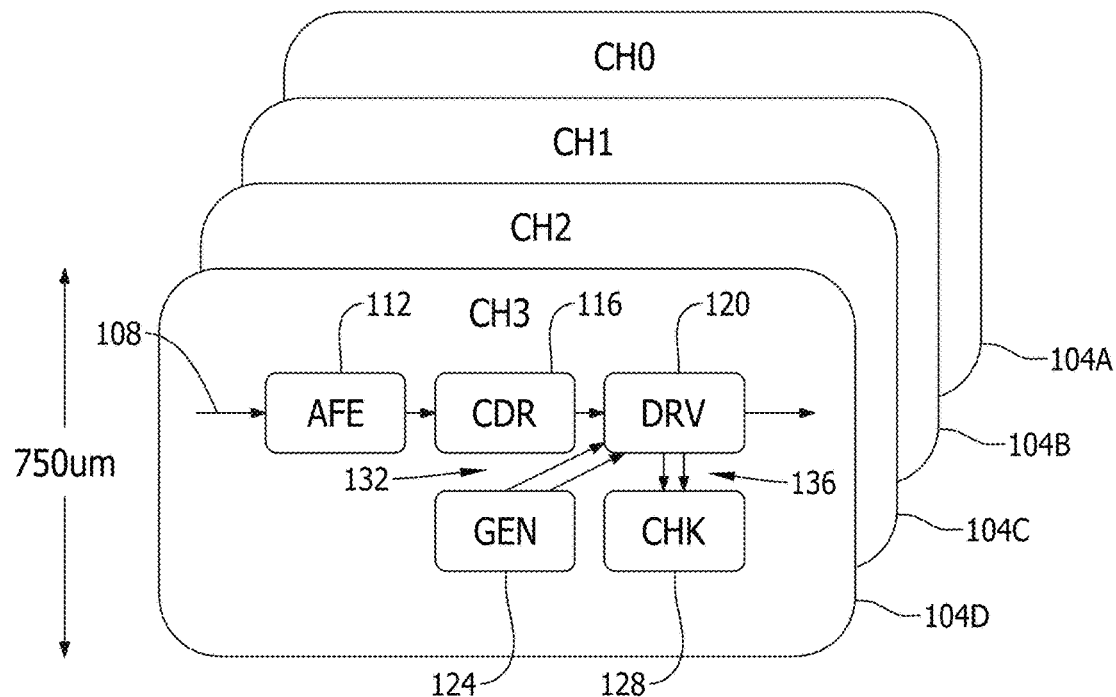
FIG. 1 illustrate an exemplary prior art multi-channel communication system with co-integrated diagnostic elements.
Figure 2:
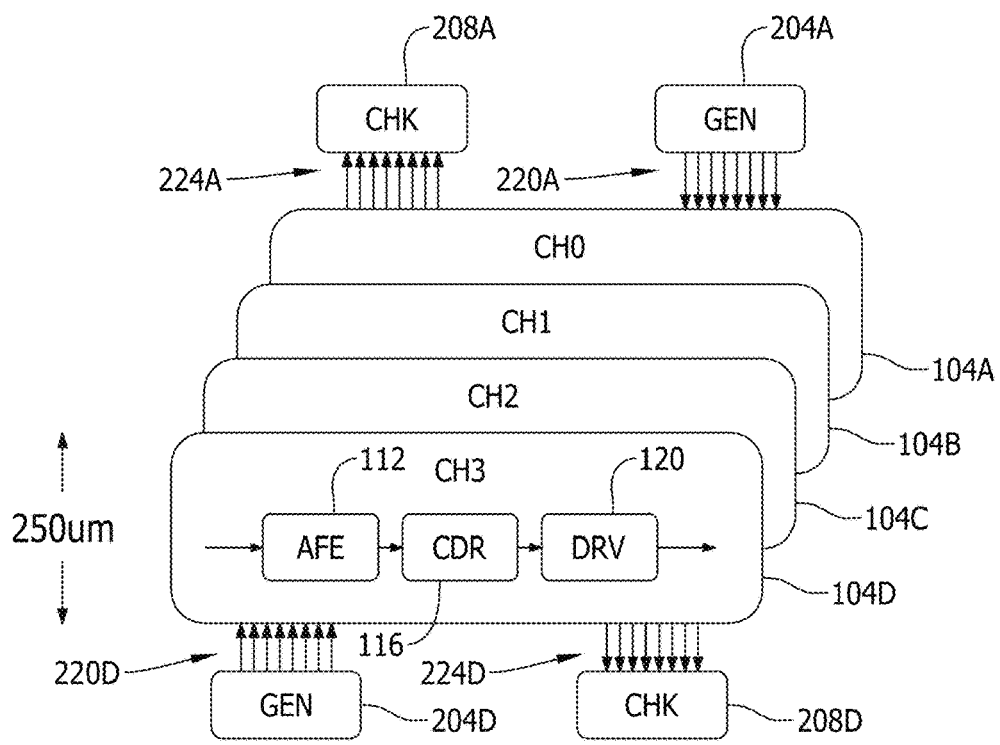
FIG. 2 illustrates an alternative prior art design when the allocated channel width per channel is 250 μm.

This embodiment has several benefits over the prior art shown in FIGS. 1 and 2. As shown, space savings are realized by reducing the system count from four sequence generators and four error checkers of FIG. 1, to each channel sharing the pattern generator 412 and error checking module 408. This is a significant reduction in area requirements. This allows the systems to fit on the die when the allocated channel width is reduced to 250 μm. As compared to the system of FIG. 2, only two conductive paths 416, 420 are required instead of the eight large paths (two for each channel to diagnostic element). This reduces layout complexity, signal coupling, and size requirements (two paths versus eight paths of FIG. 2).

Figure 5:
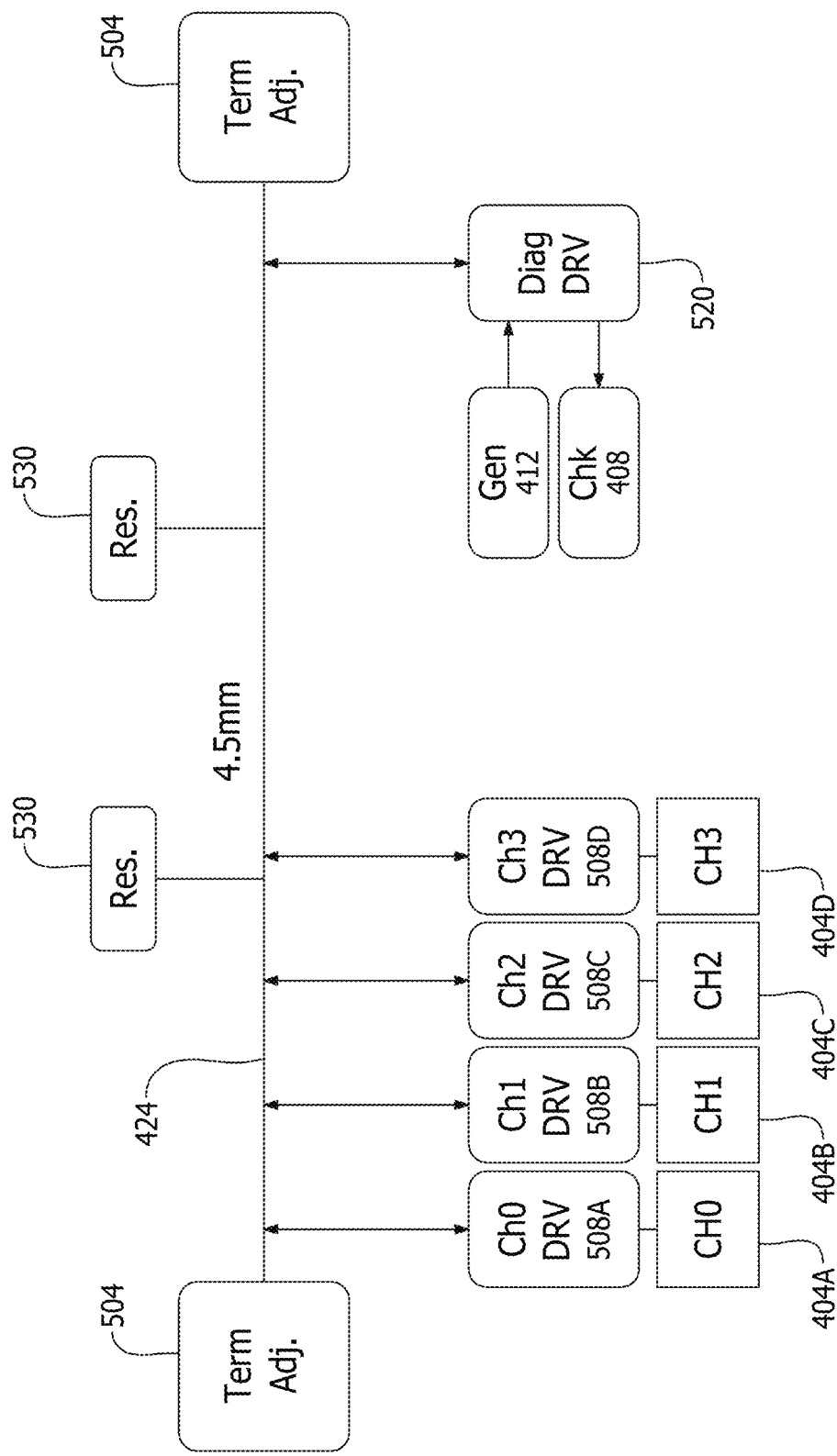
FIG. 5 illustrates an exemplary high-speed communication system of FIG. 4.

FIG. 5 illustrates an exemplary high-speed communication system of FIG. 4. In relation to FIG. 4, the channel 0 404A, channel 1 404B, channel 2 404C, and channel 3 404D are shown. Associated with each channel is a channel driver 508A, 508B, 508C, 508D which connect to the shared bus 424. Although shown as a single line, the bus 424 includes two conductive paths. Also connected to the bus 424 is a diagnostic system driver 512 which connects to the sequence generator 412 and the error checker 408. The diagnostic system driver 512 interfaces the bus 424 to the sequence generator 412 and the error checker 408. The drivers 520, 508 function to feed the signal through the channel. Although the sequence generator 412 and the error checker 408 share driver 520, it is also contemplated that the generator and checker may each have a driver.

At each end of the bus 424 is an adjustable termination element 504. The termination element 504 comprises any type resistance or impedance configured to match the bus 424 impedance. The impedance of the termination element 504 and its matching to the bus 424 may be selected to minimize reflections or minimize power loss or mitigate jitter. Thus, in some embodiments, the resistance or impedance of the termination element 504 is not an exact match to the resistance or impedance of the bus 424. The termination elements 504 may be adjustable and may be formed from resistor, MOS switch, or any other element or elements. Also shown in FIG. 5 are one or more loads 530, such as, pull up resistors, configured to reduce reflections and jitter. These loads 530 are selectively and strategically placed and sized based on testing to accommodate high frequency operations, such as operation at 30 Gb/s. Any number of loads 530 may be placed at any location along the bus 424. An optimization algorithm may be utilized to guide location, number, and value of the loads 530.

In operation, either the signal generator 412, the error checker 408 or both may be enabled for operation. In the error checking mode, incoming data is provided to a particular channel, for example, channel 1 404B. To determine if this incoming data has an error, the data is sent, suing the channel 1 driver 508B over the bus 424 to the error checker 408 which checks for errors in the received data. If the sequence generator 412 is active, the sequence generator creates the sequence which is transmitted to the bus 424 with the diagnostic system driver 520. From the bus 424, the sequence is directed to desired channel 404. Any channel can be selected via register setting and local switch. With a common channel, the sequence generator and error checker cannot be both active at the same time, which is not required by the application.

Figure 6A:
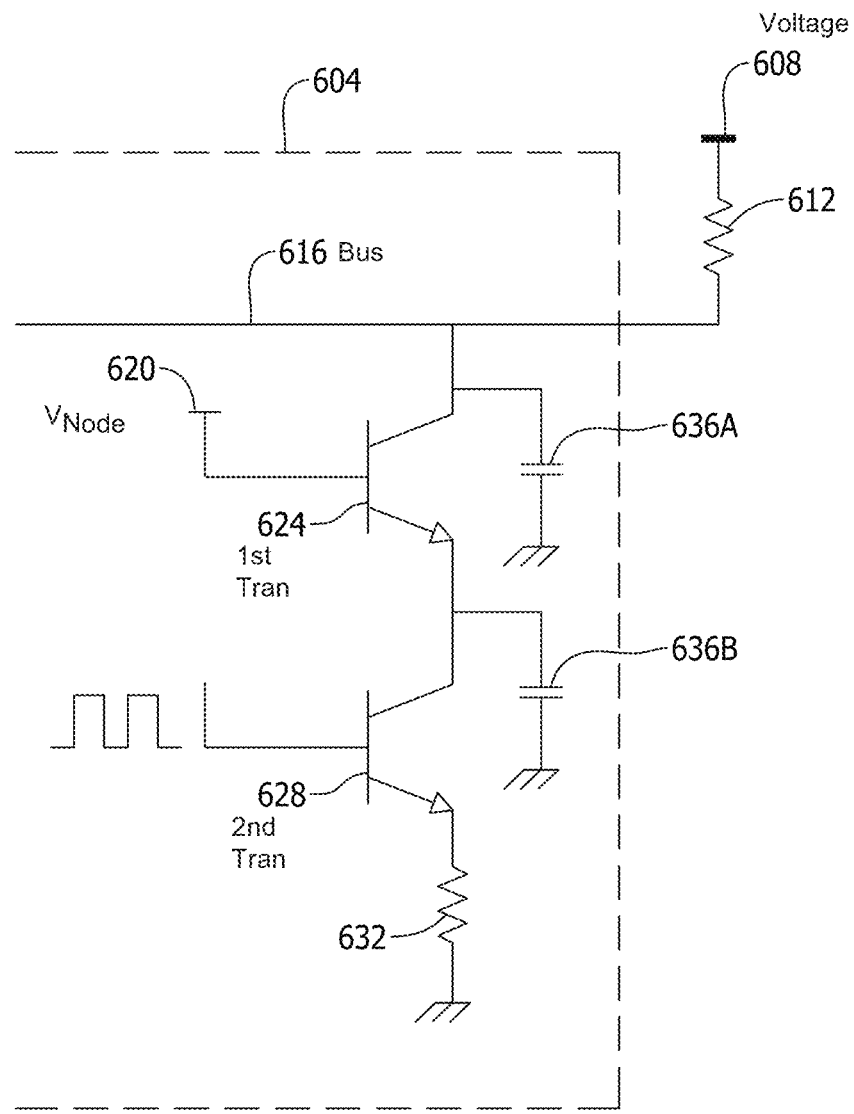
FIG. 6A illustrates an exemplary driver circuit.

FIG. 6A illustrates an exemplary driver circuit. This is but one possible configuration for a driver circuit. In this embodiment, the driver circuit is an open collector Current Mode Logic (CML) driver in cascode arrangement using bipolar technology. Other technologies such as CMOS, BiCMOS or HBT may be used without deviating from the scope of the invention. The driver die 604 contains the circuitry as shown. A resistor 612 is connected between the voltage node 608 and the driver and is connected by a bus 616. The driver includes a first transistor 624 and a second transistor 628 which are arranged in a cascode configuration. The transistor 624 has a base connected to a voltage node 620 and a collector connected to opposing terminal of the resistor 612. Also connecting to the emitter terminals is a capacitor 636A, which has an opposing terminal connected to a reference ground. The size of the capacitor 636A is lower than the capacitor 636B. The smaller capacitor 636A provides the benefit of reducing or eliminating discontinuity which will cause unwanted reflections. The emitter of the transistor 624 connects to a collector terminal of transistor 628 as shown. The base of transistor 628 connects to a voltage node 620 while the emitter terminal connects to ground through a resistor 632. This configuration isolates the sensitive node (bus node 616) from die 640 shown in FIG. 6B.

Figure 6B:
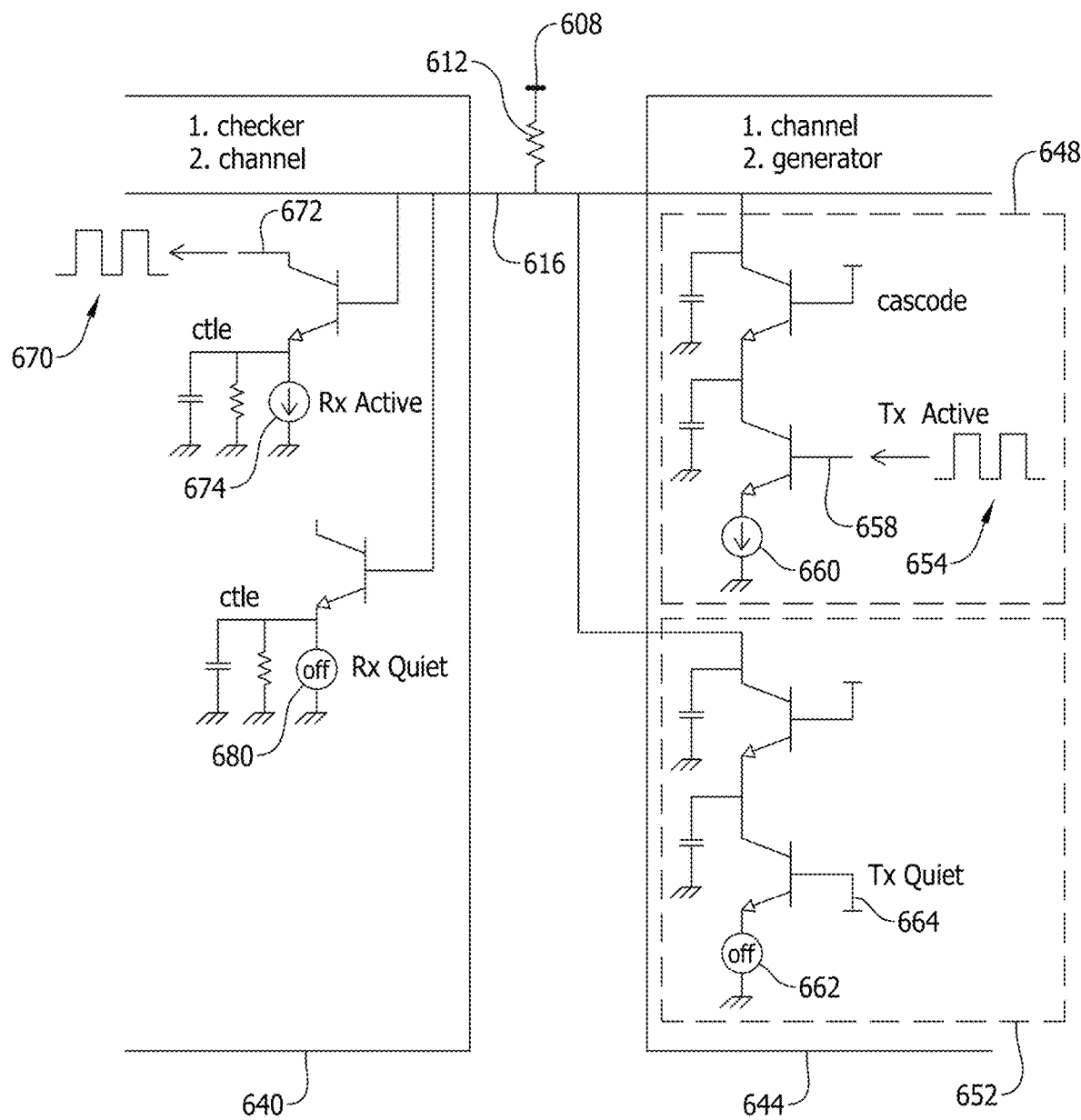
FIG. 6B illustrates an exemplary end to end driver circuit with interconnect bus.

FIG. 6B illustrates an exemplary die to die communication system with associated drivers. This embodiment shows the bus 616 interconnecting a first die 640 and a second die 644. The dies may contain channels processing elements or be part of the error checker or sequence generator. The pullup resistor 612 is also shown as it connects to the bus 616 and a voltage node 608. The second die 644 is configured in transmit mode with transmit active sub-circuit 648 and transmit quite sub-circuit 652. The signal 654 to be transmitted on the bus 616 is presented to input 568 and the current source 660 is active. During transmit quiet mode, the current source 662 is off and the input 664 is tied to ground.

In the first die 640 during receive active mode, the signal 670 is received over the bus 616 and presented on output 672. During receive active mode, the current source 674 is active. During receive quiet mode the current source 680 is off. FIG. 6B illustrates one exemplary circuitry for a driver and bus system and it is contemplated that other circuit configurations may be created with depart from this exact circuit but do not depart from the claims.

Figure 7:
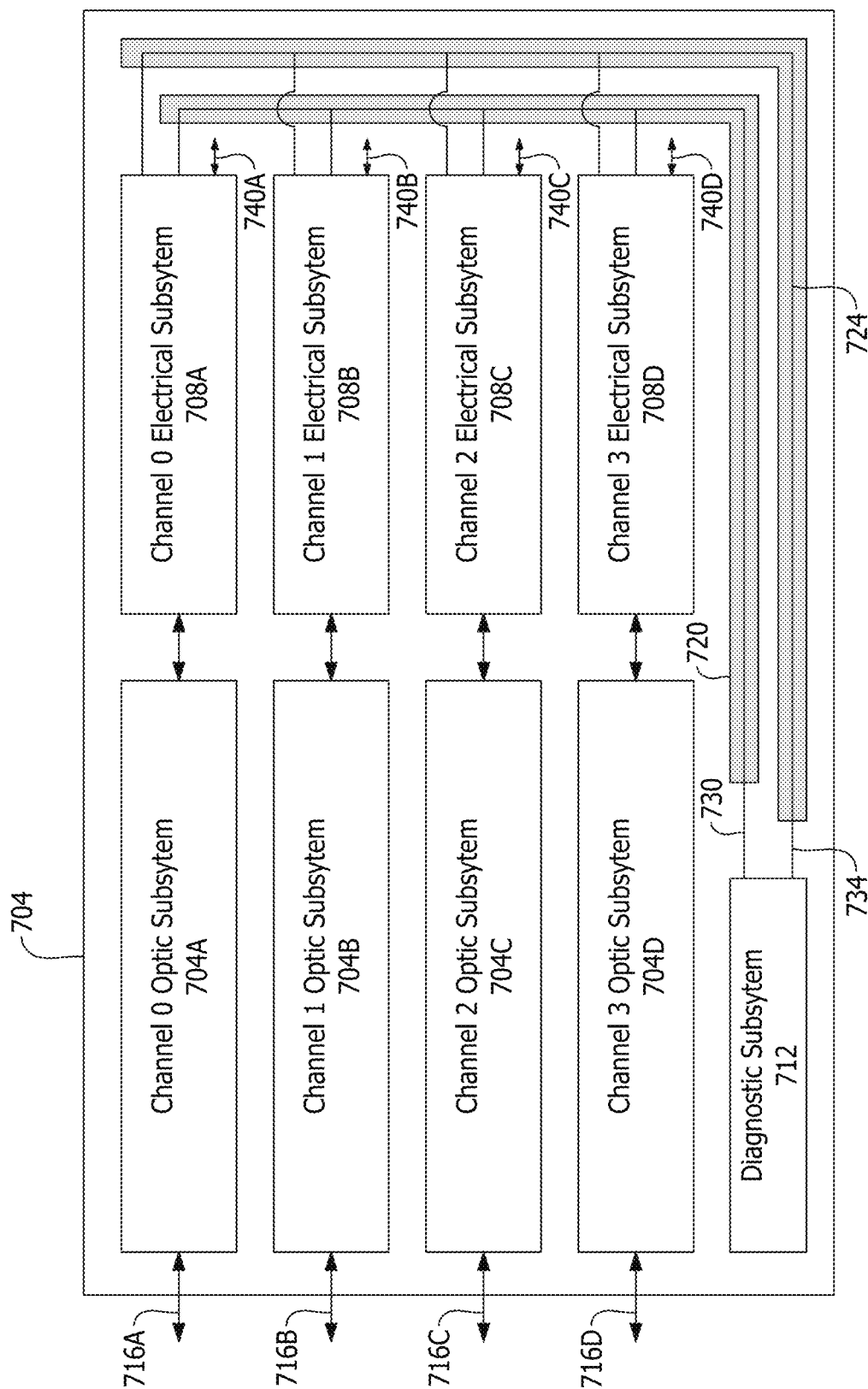
FIG. 7 illustrates a bus layout geometry for a die with multiple optical module.

FIG. 7 illustrates a bus layout geometry for a die with multiple optic subsystems. This is but one possible bus layout, and as such, other embodiments are possible without departing from the claims that follow. Elements which have been described above or are known in the art are not described in detail, instead focus being on the novel aspects. Shown is a die 704 configured with four channels referenced as channel 0, channel 1, channel 2 and channel 3. This system is defined generically but may be configured as a transmitter or receiver. Connecting to or providing a signal to the die 704 are optic fibers 716A, 716B, 716C, 716D which carry optic signals to optic subsystems 704A, 704B, 704C 704D part of each channel. The optic subsystems 704A, 704B, 704C 704D, when the system is configured as a receiver, convert the optic signal to electrical signals which are provided to electrical subsystems 708A, 708B, 708C 708D. An example of such optical subssytems could be a photodetector coupled with a Transimpedance Amplifier (TIA). The electrical subsystems 708A, 708B, 708C 708D processes the signal to recover the clock and data signal which are provided on outputs 740A, 740B, 740C, 740D to downstream elements. If configured as a transmitter, the electrical subsystems 708 prepare the data for transmission and provide the data to the optic subsystem 704 which transmits the date over the optic fibers 716. Examples of such optical subsystems include but are not limited to: a modulator driver with a silicon photonics component or a laser driver with a laser. Other embodiments are possible.

The shared diagnostic subsystem 712 is shown in relation to each channel. A novel method of bus routing is shown such the data path 730 used by the shared diagnostic subsystem 712 is located under the main power supply pad ring 720 or the ground pad ring 724. Similarly, the clock path 734 used by the shared diagnostic subsystem 712 is located under the main power supply pad ring 720 or the ground pad ring 724. As shown, the data path 730 and clock path 734 connect to each of the channels as shown.

Placing the data path 730 and the clock path 734 under the ground pad ring 724 and the power pad ring 720 provide several advantages. The data path 730 and the clock path 734 are high speed communication paths and as such require controlled impedance traces and take up a large amount of space due to the wavelength of signals which travel these paths. One such advantage is that space is currently not in use and the ground pad ring 724 and the power pad ring 720 are low impedance which are ideal for use as a transmission line reference. Further, this area is generally free from disturber signals and there is sufficient space for the size of the data path 730 and the clock path 734.

Figure 8:
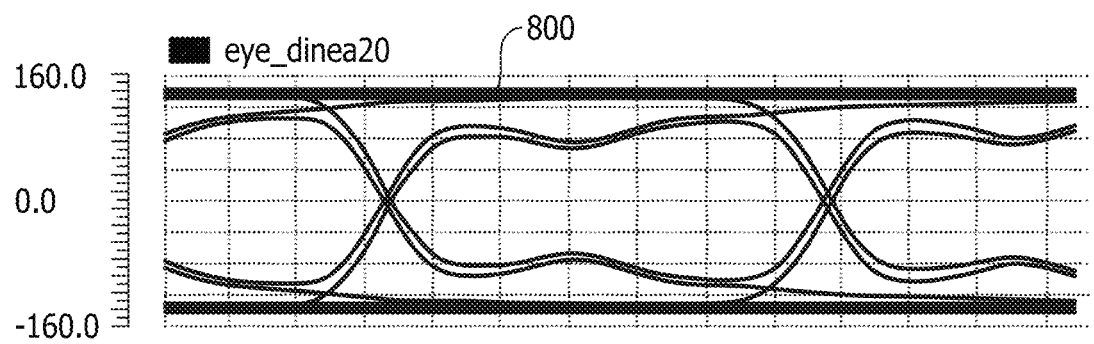
FIG. 8 illustrates exemplary signal plot results for the high-speed communication over the diagnostic signal bus.

FIG. 8 illustrates exemplary signal plot results for the high-speed communication over the diagnostic signal bus. These plots show eye diagrams of recovered data either sent to the error checker or transmitted sequence signal sent over the bus used by the diagnostic system to communicate with each channel. The plot 800 is from an ATLC electromagnetic solver modeling software. As can be seen from these plots, the data signal, the generated sequence signal, and the clock signal are well recovered after transmission over the bus.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A shared bus system for inter-channel communication comprising:
    two or more channels having signal processing elements, each channel configured to receive and process an incoming channel specific signal;
    a sequence generator configured to generate a test sequence suitable for testing the signal processing elements of a channel;
    an error checker configured to error check incoming channel specific signals;
    a shared bus connected to the two or more channels to:
        communicate an incoming channel specific signal to the error checker; and
        communicate the test sequence to the signal processing elements of a channel;
    one or more electronic load circuits pull up resistors connected to the shared bus.

2. The shared bus system of claim 1 wherein the bus consists of a clock signal path and a data signal path.

3. The shared bus system of claim 1 wherein the test sequence is a pseudo-random bit sequence.

4. The shared bus system of claim 1 wherein the electronic load circuits are selected to optimize reflection and jitter and the electronic load circuits may comprise one or more resistors, one or more combinations of resistors with peaking inductors, or one of more active devices.

5. The shared bus system of claim 1 wherein the error checker is configured to compare the incoming channel specific signal to known channel specific signal generated by the sequence generator to detect errors.

6. The shared bus system of claim 1 wherein each channel has a bus interface comprising an open collector current mode logic driver in cascode arrangement.

7. A method for inter-channel communication over a shared bus comprising:
    initiating an error checking mode for a selected channel;
    for the selected channel, enabling transmission or receipt of transmitted or received data over the shared bus, the transmitted or received data is selected data;
    for non-selected channels, disabling transmission or receipt of data over the shared bus;
    generating sequence data with a sequence generator;
    transmitting sequence data over the shared bus from the sequence generator to the selected channel;
    processing the sequence data with the selected data to create processed sequence data;
    error checking the processed sequence data for errors by comparing the processed sequence data to the sequence data.

8. The method of claim 7 wherein the shared bus consists of a clock signal path and a data signal path.

9. The method of claim 7 wherein the sequence data is a pseudo-random bit sequence.

10. The method of claim 7 wherein a size, location, and number of pull up resistors are selected to optimize reflection and jitter.

11. The method of claim 7 wherein the error checker mode is configured to compare a incoming channel specific signal to a known channel specific signal generated by the sequence generator to detect errors.

12. The method of claim 7 wherein each channel has a bus interface comprising an open collector current mode logic driver in cascode arrangement.

13. An inter-channel communication system comprising:
    two or more data communication channels, each having data processing components;
    a bus driver associated with each channel, wherein the bus driver is configured to:
    seize or release a shared bus;
    transmit or receive data over the shared bus;
    the shared bus connected to the bus driver associated with each channel, the shared bus also connected to at least one of an error checker and a sequence generator, the sequence generator being configured to generate sequence data.

14. The communication system of claim 13 wherein the shared bus is a two conductor bus that consists of a clock signal path and a data signal path.

15. The communication system of claim 13 wherein the sequence generator is configured to generate a pseudo-random bit sequence and transmit the pseudo-random bit sequence over the shared bus using a bus driver associated with the sequence generator.

16. The communication system of claim 13 further comprising two or more pullup resistors connected to the shared bus.

17. The communication system of claim 13 wherein the error checker is configured to process the sequence data generated by the sequence generator, after processing by the data processing components, to detect errors.

18. The communication system of claim 13 wherein bus driver comprises an open collector current mode logic driver in cascode arrangement.

19. The communication system of claim 13 further comprising one or more termination resistors connected to a shared bus to reduce reflections and jitter.

* * * * *